(12) United States Patent
Sgarabottolo

(10) Patent No.: US 9,302,929 B2
(45) Date of Patent: Apr. 5, 2016

(54) TILTING DEVICE FOR CROPPING A SHEET OF LAMINATED GLASS

(75) Inventor: Silvano Sgarabottolo, Foshan (CN)

(73) Assignee: Newtech-Engineering S.r.l., Thiene (Vicenza) (IT)

( * ) Notice: Subject to any disclaimer, the term of this patent is extended or adjusted under 35 U.S.C. 154(b) by 20 days.

(21) Appl. No.: 13/504,189

(22) PCT Filed: Oct. 27, 2010

(86) PCT No.: PCT/EP2010/066245
§ 371 (c)(1),
(2), (4) Date: Apr. 26, 2012

(87) PCT Pub. No.: WO2011/051329
PCT Pub. Date: May 5, 2011

(65) Prior Publication Data
US 2012/0213624 A1    Aug. 23, 2012

(30) Foreign Application Priority Data
Oct. 28, 2009   (IT) .............................. PD2009A0313

(51) Int. Cl.
*B26F 3/00* (2006.01)
*C03B 33/033* (2006.01)
*C03B 33/07* (2006.01)

(52) U.S. Cl.
CPC ............... *C03B 33/033* (2013.01); *B26F 3/00* (2013.01); *C03B 33/078* (2013.01); *B65G 2249/045* (2013.01)

(58) Field of Classification Search
CPC ....... B26F 3/00; B26F 3/002; Y10T 225/325; Y10T 225/30; Y10T 225/304; Y10T 225/307; Y10T 225/321; Y10T 225/371; Y10T 225/379; Y10T 225/386; Y10T 83/8804; Y10T 83/8805; Y10T 83/8841; Y10T 83/8843; C03B 33/00; C03B 33/02; C03B 33/10

USPC ............ 225/93, 93.5, 94, 96, 96.5, 103–105; 83/601, 602, 627, 628

See application file for complete search history.

(56) References Cited

U.S. PATENT DOCUMENTS 3,655,070 A  *  4/1972  Haydu .................... 198/621.1
3,735,852 A  *  5/1973  O'Keefe ..................... 83/613
(Continued)

FOREIGN PATENT DOCUMENTS

CH    683917 A5   1/1994
EP    1044930 A2   10/2000

OTHER PUBLICATIONS

International Search Report; International Patent Application PCT/EP2010/066245; International Application Filing Date Oct. 27, 2010; Mail date Dec. 6, 2010.

(Continued)

*Primary Examiner* — Phong Nguyen
(74) *Attorney, Agent, or Firm* — Stolmar & Partner; Robert Lelkes

(57) ABSTRACT

A tilting device for cropping a sheet of laminated glass, comprising two side-by-side rows of suckers, each supported by a bar of a frame which is pivoted, on the opposite side with respect to the suckers, to a supporting structure, the bars both resting on the same elements for the alternating lifting and lowering of the bars, which are adapted to produce the simultaneous alternating tilting of both of the frames and of the corresponding rows of suckers.

5 Claims, 10 Drawing Sheets

(56) References Cited

U.S. PATENT DOCUMENTS

| | | | |
|---|---|---|---|
| 5,165,585 A * | 11/1992 | Lisec | 225/2 |
| 5,297,710 A | 3/1994 | Juras | |
| 5,475,196 A * | 12/1995 | Lisec | 219/121.39 |
| 5,655,646 A * | 8/1997 | Soderlund et al. | 198/841 |
| 6,427,305 B1 * | 8/2002 | Graham et al. | 198/346.3 |
| 6,434,974 B1 | 8/2002 | Lisec | |
| 2006/0261117 A1 * | 11/2006 | Konrad et al. | 225/2 |
| 2007/0125213 A1 * | 6/2007 | Moilanen | 83/418 |

OTHER PUBLICATIONS

Written Opinion; International Patent Application PCT/EP2010/066245; International Application Filing Date Oct. 27, 2010; Mail date Dec. 6, 2010.

* cited by examiner

TILTING DEVICE FOR CROPPING A SHEET OF LAMINATED GLASS

CROSS-REFERENCE TO RELATED APPLICATIONS

The application is the U.S. national phase under 35 USC §371 of international application no. PCT/EP2010/066245 filed on Oct. 27, 2010, which claims priority based on patent application no. PD2009A000313 filed in Italy on Oct. 28, 2009.

BACKGROUND OF THE INVENTION

1. Field of the Invention

The present invention relates to a tilting device for cropping a sheet of laminated glass.

2. Description of Related Art

Nowadays, in order to carry out the truncation, known in the jargon as "cropping", of a flat sheet of laminated or stratified glass being worked on a worktable of a cutting machine, two operating principles are generally applied in order to mechanically (i.e. not via heat or chemical means) break the intermediate layer of plastic material: bending of the sheet in the cutting region, or traction of the sheet in the direction of movement of the two parts of the sheet defined by the cut.

Bending of the sheet is generally done by means of two series of suckers, which are designed to adhere to the inner face of the sheet in proximity to the cutting line, with a first series of suckers on one side of the cutting line, and the second series on the other side.

The suckers are then lowered a few millimeters in order to produce a bending, or a cycle of bendings, downwards, in order to achieve the complete breakage of the intermediate layer of plastic material.

This downward bending, or these downward bending cycles, are often insufficient to achieve the immediate separation of the two parts of the sheet being worked, thus requiring to resort to ancillary activities which lengthen the working times.

Traction of the two parts of the cut sheet is achieved with means for gripping each of the two parts, comprising various actuator means, and means for moving at least one of the two parts of the sheet on the plane of arrangement of the same worktable, such movement means being complex in terms of devising and operation.

The traction solution is therefore effective, but it requires machines that are relatively complex and expensive.

The aim of the present invention is to devise a tilting device for cropping a sheet of laminated glass, which is capable of overcoming the drawbacks of the above mentioned known cropping techniques.

Within this aim, an object of the invention is to provide a tilting device which is capable of bending a sheet around the cut region, in a more effective manner than in known tilting devices.

Another object of the invention is to provide a tilting device that is cheaper to make than traction cropping devices yet no less effective.

Another object of the invention is to provide a tilting device for cropping a sheet of laminated glass that is structurally simple and easy to use, and which can be made using known systems and technologies and at low cost.

BRIEF SUMMARY OF THE INVENTION

This aim and these and other objects which will become better apparent hereinafter are achieved by a tilting device for cropping a sheet of laminated glass, characterized in that it comprises two side-by-side rows of suckers, each supported by a pivot frame which is pivotable to a support frame at an end of the pivot frame opposite to the end of the pivot frame proximal to the suckers, relative to a support frame, said pivot frames both resting on the same device for lifting and lowering of the ends of said pivot frames distal from said pivotable ends, which are adapted to produce the simultaneous alternating tilting of both of said pivot frames and of the corresponding rows of suckers.

BRIEF DESCRIPTION OF THE DRAWINGS

Further characteristics and advantages of the invention will become better apparent from the following detailed description of a preferred, but not exclusive, embodiment of the tilting device according to the invention, illustrated, by way of non-limiting example, in the accompanying drawings, wherein.

DETAILED DESCRIPTION OF THE INVENTION

Figure 1:
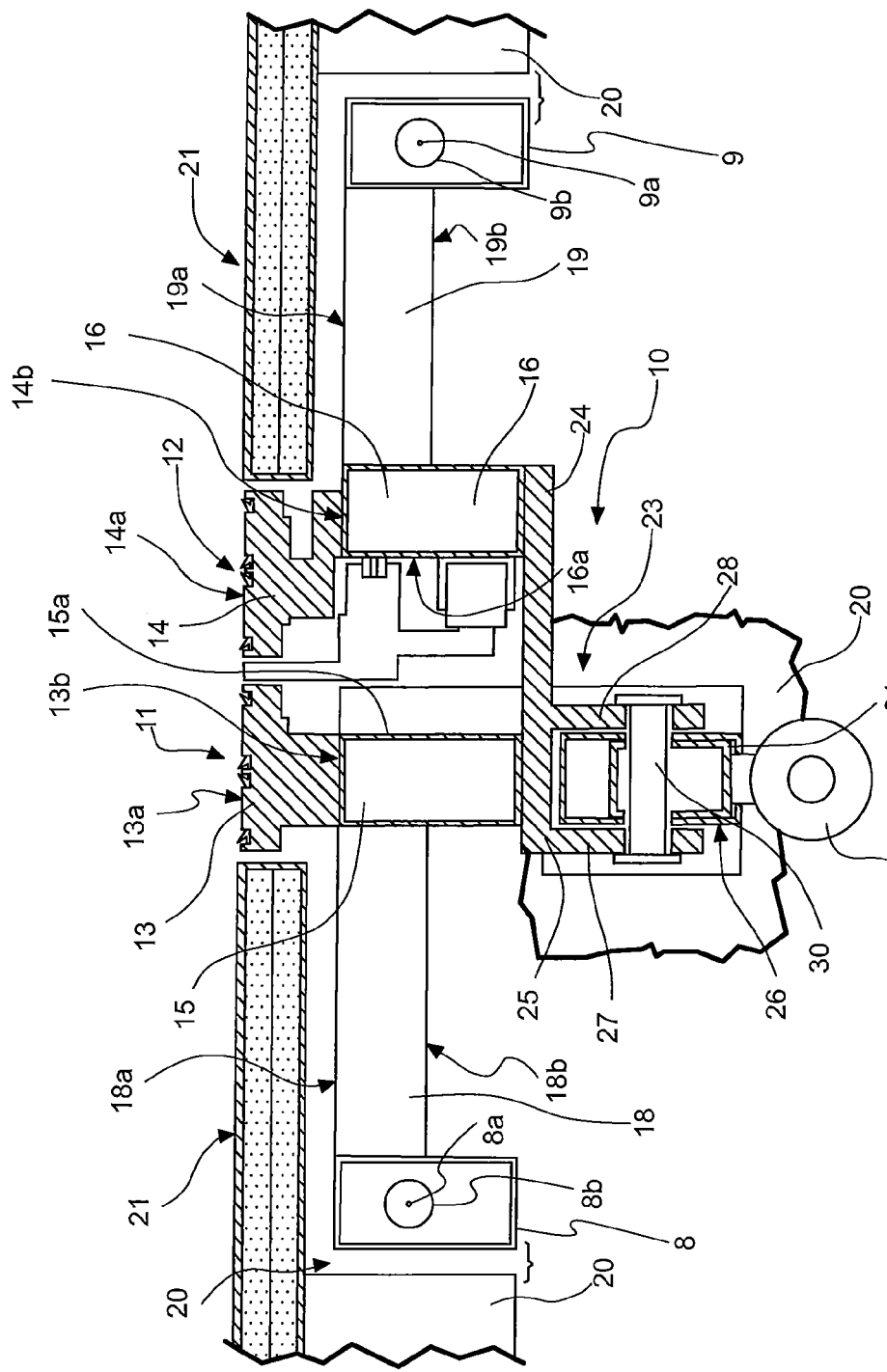
FIG. 1 is a sectional side view of the device according to the invention in the inactive configuration shown in FIG. 1A.
Figure 1A:
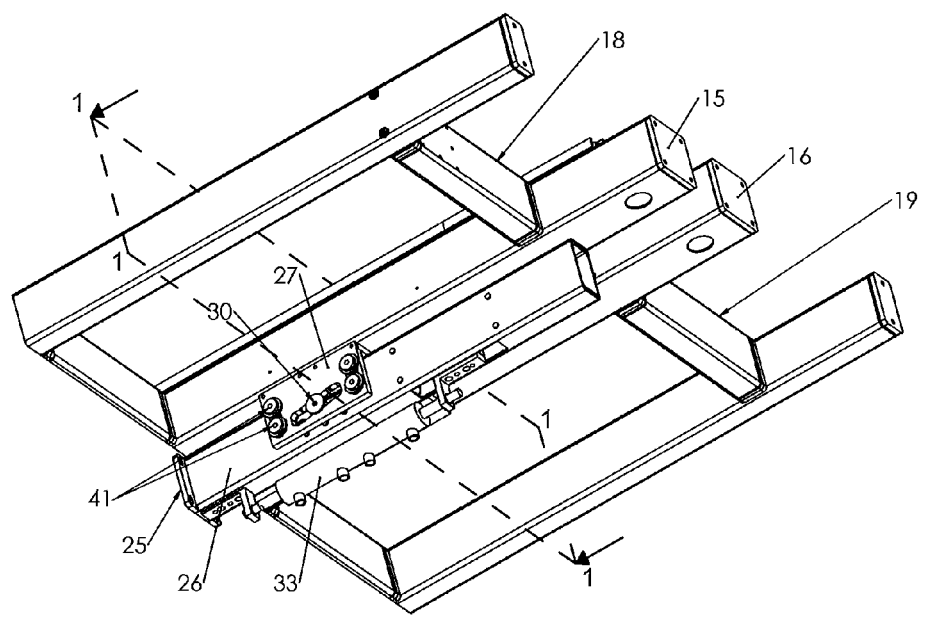
FIG. 1A is a bottom perspective view of a device according to the invention in the inactive configuration.
Figure 2:
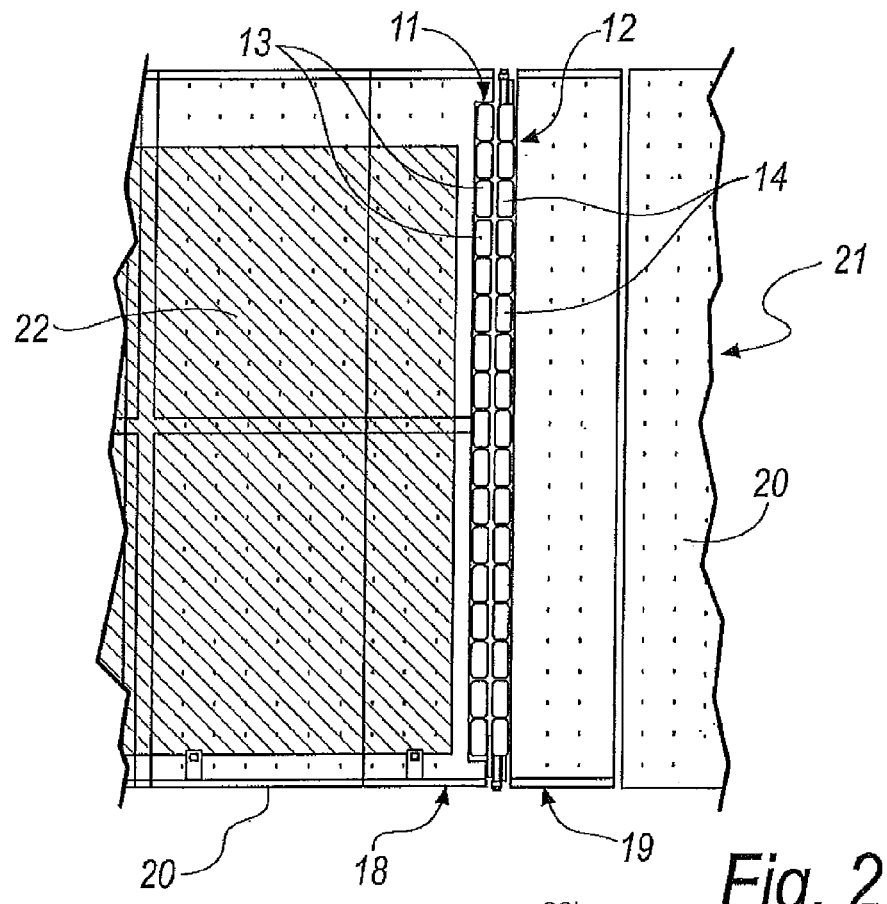
FIG. 2 is a top view of a cutting surface for sheets of laminated glass, provided with a tilting device according to the invention.

With reference to the figures, a tilting device for cropping a sheet of laminated glass is generally designated by the reference numeral 10.

In one embodiment, the tilting device 10 comprises:

a support frame 20;

a first pivot frame 18 pivotably attached via a pivotable attachment 8b to the support frame 20 having an upper side 18a, a lower side 18b, a first end 8 having a pivot point 8a about its pivotable attachment 8b to the support frame 20 and a second end 15a distal from its pivot point 8a;

a second pivot frame 19 pivotably attached via a pivotable attachment 9b to the support frame 20 having an upper side 19a, a lower side 19b, a first end 9 having a pivot point 9a about its pivotable attachment 9b to the support frame 20 and a second end 16a distal from its pivot point 9a;

first and second glass engagement structures 13, 14, wherein the first and second glass engagement structures 13, 14 each have an upper side 13a, 14a and a lower side, 13b, 14b, wherein the upper side 13a, 14a of each of the first and second glass engagement structures 13, 14 comprising one or more rows of suckers 11, 12, the lower side 13b, of the first glass engagement structure 13 is affixed to and supported by the upper side 18a of the second end 15a of the first pivot frame 18 and the lower side 14b of the second glass engagement structure 14 is affixed to and supported by the upper side 19a of the second end 16a of the second pivot frame 19;

a lift 23 below the lower side 18b, 19b of the second ends 15a, 16a of the first and second pivot frames 18, 19 for simultaneously lifting and simultaneously lowering the distal ends 15a, 16a of the first and second pivot frames 18, 19 relative to a horizontal position for simultaneous tilting of the first and second pivot frames 18, 19 and the corresponding first and second glass engagement structures 13, 14, wherein wherein the first end 8 of the first pivot frame 18 and the first end 9 of the second pivot frame 19 are at horizontally spaced apart locations and the first and second pivot frames 18, 19 are arranged such that the second end 15a of the first pivot frame 18 is proximal to the second end 16a of the second pivot frame 19 and the second ends 15a, 16a of the first and second pivot frames 18, 19 are between the first ends 8, 9 of the first and second pivot frames 18, 19 when the first and second pivot frames 18, 19 are pivoted to a horizontal position and said lift 23 comprises:

at least one supporting bracket 24, a tubular member 26 affixed to the at least one supporting bracket 24, and an upside-down U-shaped member 25 having an upside-down U-shaped cross-section straddling the tubular member 26, wherein each of the supporting brackets 24 has a width to receive the upside-down U-shaped member 25.

In another or the same embodiment, the tilting device 10 comprises glass engagement structures 13, 14 having two side-by-side rows and of suckers 11 and 12, each supported by a first bar 15 and and a second bar 16 respectively, of a first pivot frame 18 and a second pivot frame 19, respectively.

Each pivot frame 18 and 19 is pivotable about a first pivot 8b having a first pivot point 8a and a second pivot 9b having a second pivot point 9a, which are each at the first end 8, 9 of the pivotable frame 18, 19 that is distal with respect to the suckers 11, 12, relative to a support frame 20 for a cutting surface 21, which is designed to receive, by resting, a sheet 22 to be worked, such support frame and cutting surface being understood to be of a type that is per se known.

The bars 15 and 16 both rest on same device 23 for alternately lifting and lowering of such bars 15 and 16.

The alternately lifting and lowering devices 23 are adapted to produce the simultaneous alternating upward and downward tilting of both of the pivot frames 18 and 19 and of the corresponding rows 11 and 12 of suckers.

In the embodiment of the tilting device 10 according to the invention, described herein for the purposes of non-limiting example of the invention, the lifting and lowering device 23 may comprise a plurality of supporting brackets 24, whose width is such as to receive, by resting, both of the bars 15 and 16, an upside-down U-shaped member 25 being affixed to each support bracket 24, or pair of support brackets 24 as shown in the figures, and being arranged so as to straddle a tubular beam 26 affixed to the support frame 20.

Each upside-down U-shaped member 25 is defined by two opposing plates 27 and 28.

Each plate 27 and 28 has a cam-shaped slot 29 with steps 29a, 29b, 29c, with predominantly longitudinal extension, which is mirror symmetrical with respect to the slot of the opposite corresponding plate 27 or 28.

Such slots 29 act as guides for a cylindrical body 30, which is arranged so as to slide within each of them, the cylindrical body 30 being affixed to a slider 31, which is arranged so as to perform a translational motion within the tubular beam 26 between two stroke limits determined by the ends 32a, 32b of second slots 32 which have a rectilinear extension in the direction of advancement of the slider 31 in the tubular beam 26, such slots being formed on the tubular beam at the cam-shaped slots 29.

The slider 31, which may be an inner tubular member 31, is moved within the tubular beam 26 by actuator device 33 such as for example a fluid-operated cylinder 33, the stem 34 of which, for example, is affixed to the tubular beam 26, while a jacket 35 is fixed to the slider 31 by means of an opening 36 on the tubular beam 26. A fluid such as oil may be used to operate the cylinder 33. The slider 31 is integral to the cylinder 33 and when the cylinder 33 is under pressure, the slider 31 moves horizontally.

The operation of the tilting device 10 according to the invention is as follows.

Figure 3:
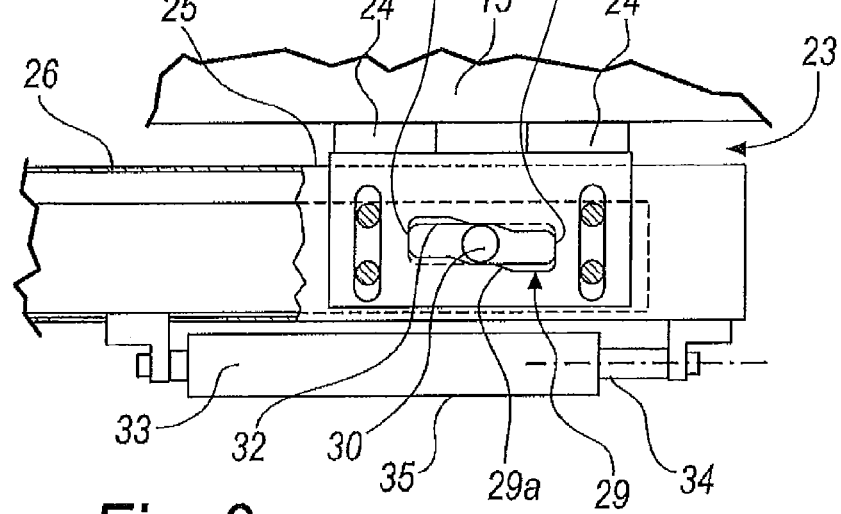
FIG. 3 is a partially sectional front elevation view of the device according to the invention in the inactive configuration of FIG. 1.
Figure 4:
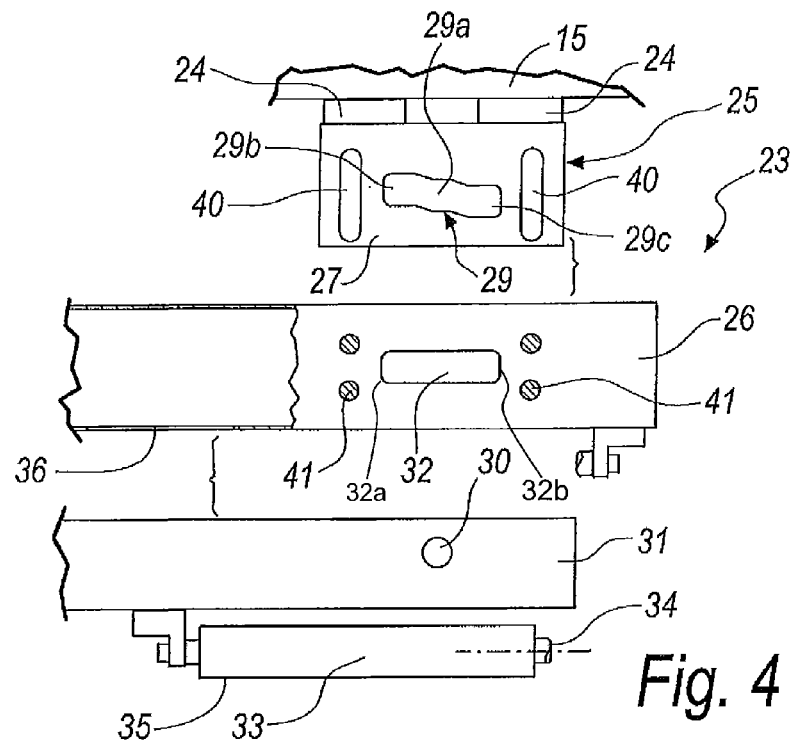
FIG. 4 is an exploded view of the device of FIG. 3.

After the cutting operations on the sheet of laminated glass are completed and any chemical, heat and/or mechanical treatments have been performed on the intermediate layer of plastic material, such operations being intended as known per se and achieved with known apparatuses and therefore not described, the operator of the machine, or the electronic control unit, commands the cylinder 33 so that from the inactive configuration, shown in FIGS. 1 and 3, the cylindrical body 30 moves from the central region 29a of the slot 29 to the lateral regions 29b and 29c alternately.

The U-shaped member 25 is prevented from sliding on the tubular beam 26 by protrusions 41 which protrude from the lateral faces of the beam 26 and are placed so as to move vertically in corresponding third slots 40, which are vertical in extension.

Figure 5:
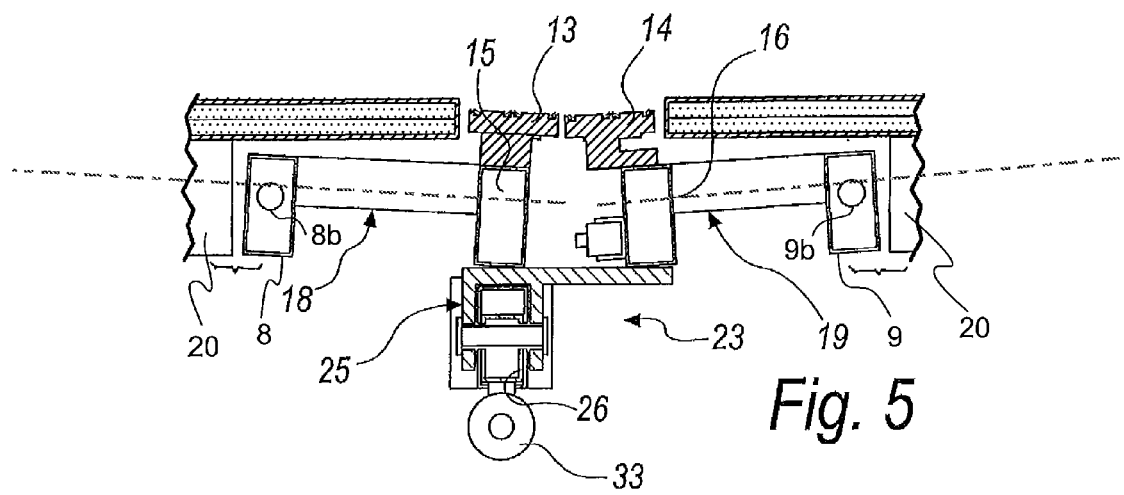
FIG. 5 is a sectional side view of the device according to the invention in a first tilting configuration, downwards.
Figure 6:
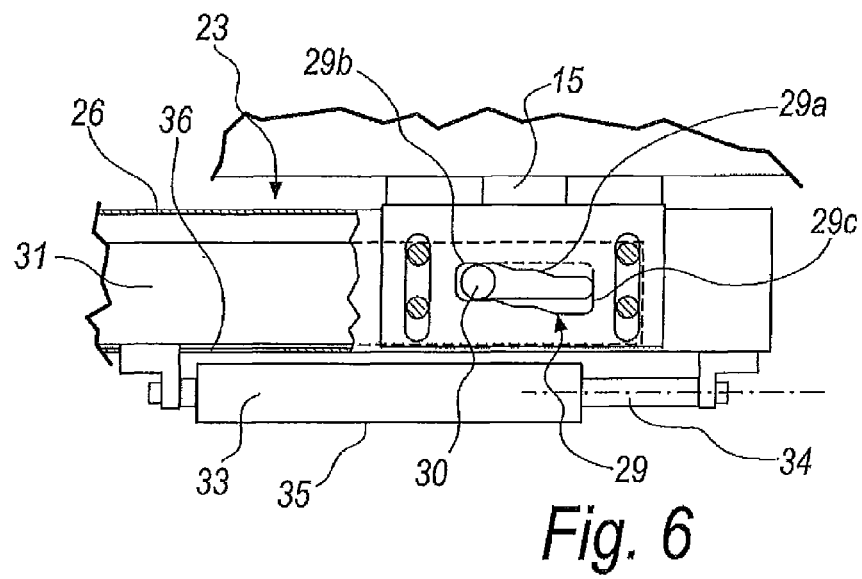
FIG. 6 is a partially sectional front elevation view of the device according to the invention of FIG. 5 in the upward tilting configuration.

For a first tilting phase, which is schematised in FIGS. 5 and 6, the cylinder 33 moves the slider 31 so that the cylindrical body 30 or pin moves in the two second slots 32 in a first direction. More particularly, a pin 30 is fixed to the slider 31 which moves inside the slot 32 in essentially a Z-shape formed in the plates 27, 28. Additional pins 41 are fixed to beam 26 and allow plates 27, 28 to slide only and exclusively in the vertical direction. As such, when the cylinder 33 is activated, the cylinder 33 pushes on slider 31, i.e., moving slider 31 back and forth, and cylindrical body 33, i.e., moving cylindrical body 33 back and forth. By means of this translational movement the downward movement of the U-shaped member 25 is obtained, since the cylindrical body 30 arranges itself in the first lateral region 29b, which with its lower edge forms a support for the cylindrical body 30 which is now at a height that is farther from the lower edge of the plate 27 than is the lower edge of the central region 29a of the slot 29.

Furthermore, the back and forth movement of cylindrical body 30 causes plates 27, 28 to move up and down, as a result of the cam-shaped slot 29. Bracket 24 is fixed to plates 27, 28 and positioned below tubes 15, 16. Tubes 15, 16 are welded to frames 18, 19, respectively, which in turn are hinged to the support frame 20. The movement of pin 30 horizontally follows a lifting (or lowering) of plate 27 and consequently plate 28, allowing frames 18, 19 to tilt positively or negatively with respect to the horizontal plane of work. As further explained below, bars 15, 16 move up and down as a result of the respective upward and downward movement of the supporting brackets 24.

The lowering of the U-shaped member 25 produces the lowering of the bracket 24 and therefore of the bars 15 and 16 which rest upon it. In this way the symmetric and simultaneous downward tilting of the frames 18 and 19 and of the respective rows of suckers 11 and 12 is obtained.

Figure 7:
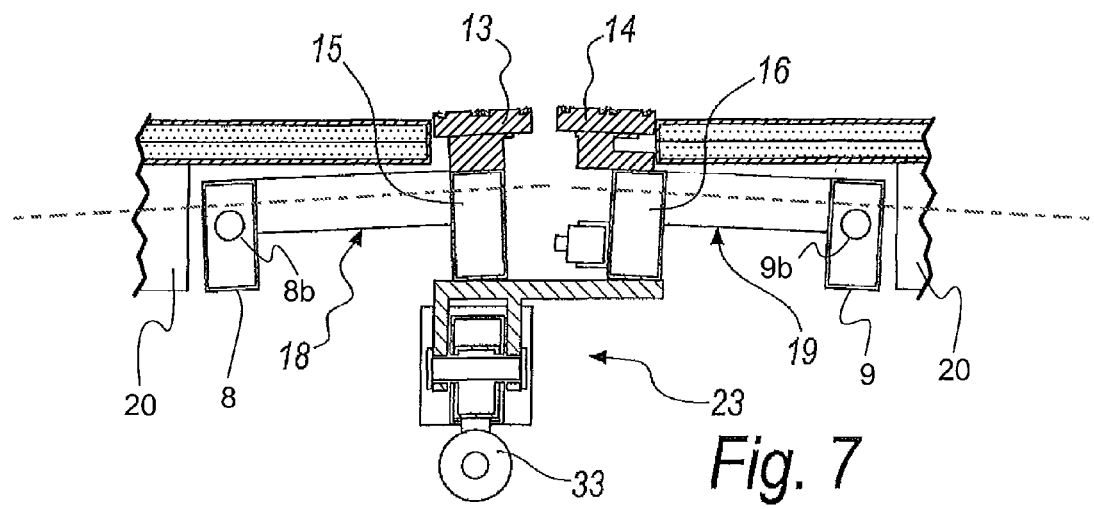
FIG. 7 is a sectional side view of the device according to the invention in a second tilting configuration, upwards.
Figure 8:
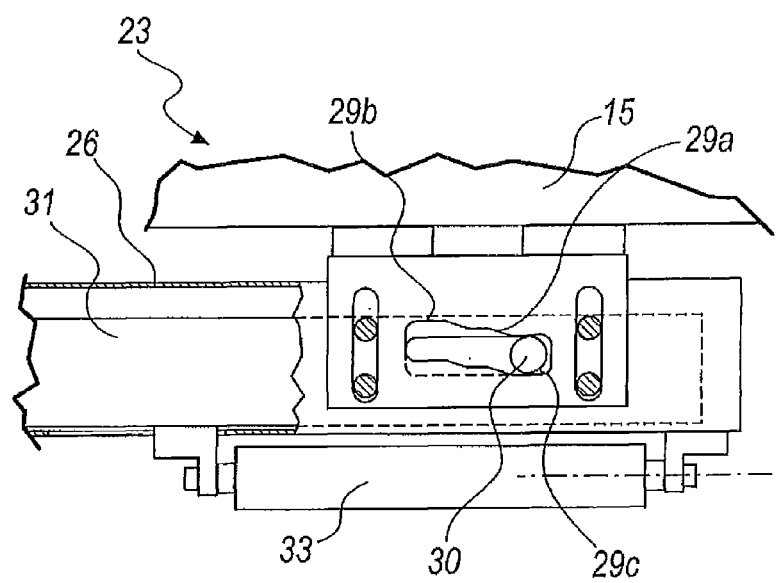
FIG. 8 is a partially sectional front elevation view of the device according to the invention in the tilting configuration of FIG. 7.
Figure 9:
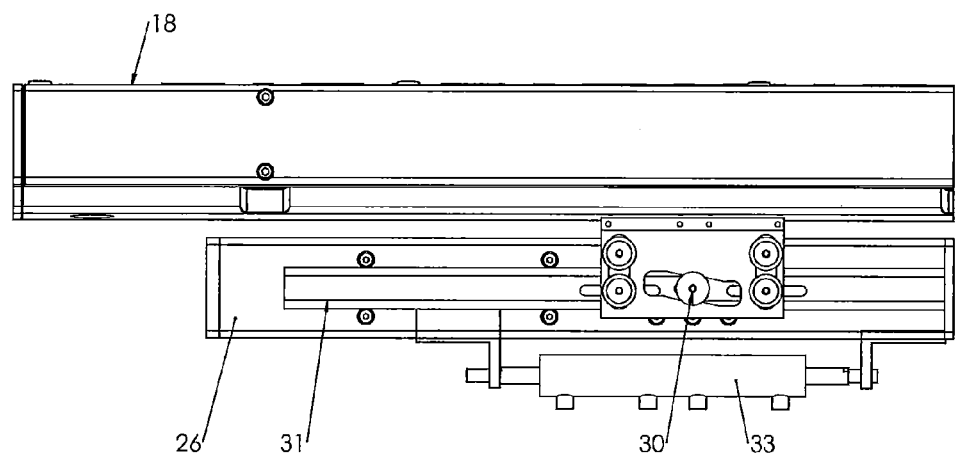
FIG. 9 is a perspective view of the device according to the invention in the tilting configuration.
Figure 10:
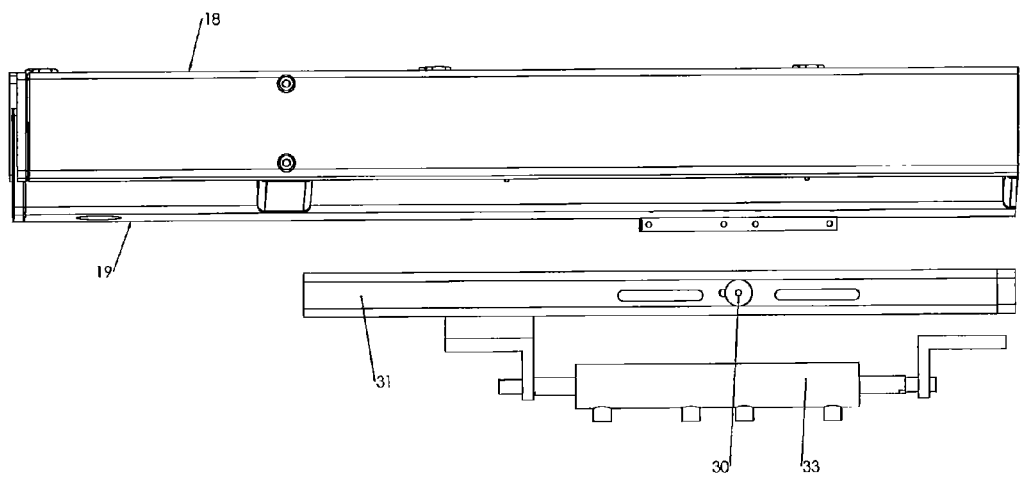
FIG. 10 is a perspective view of the device according to the invention in the tilting configuration.
Figure 11:
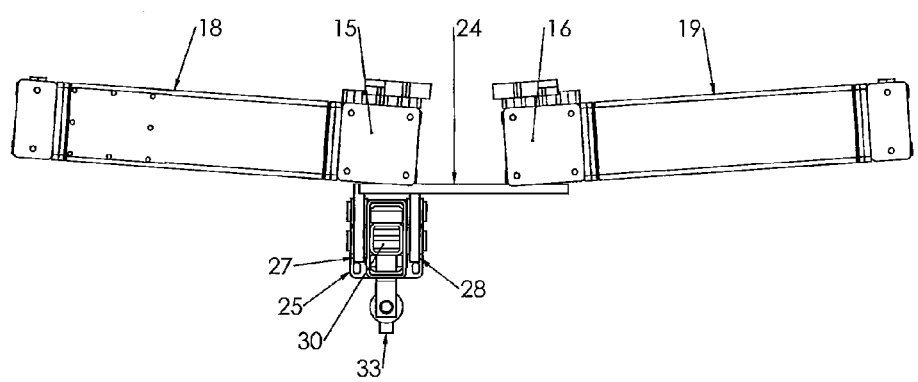
FIG. 11 is a sectional side view of the device according to the invention in the first tilting configuration.
Figure 11A:
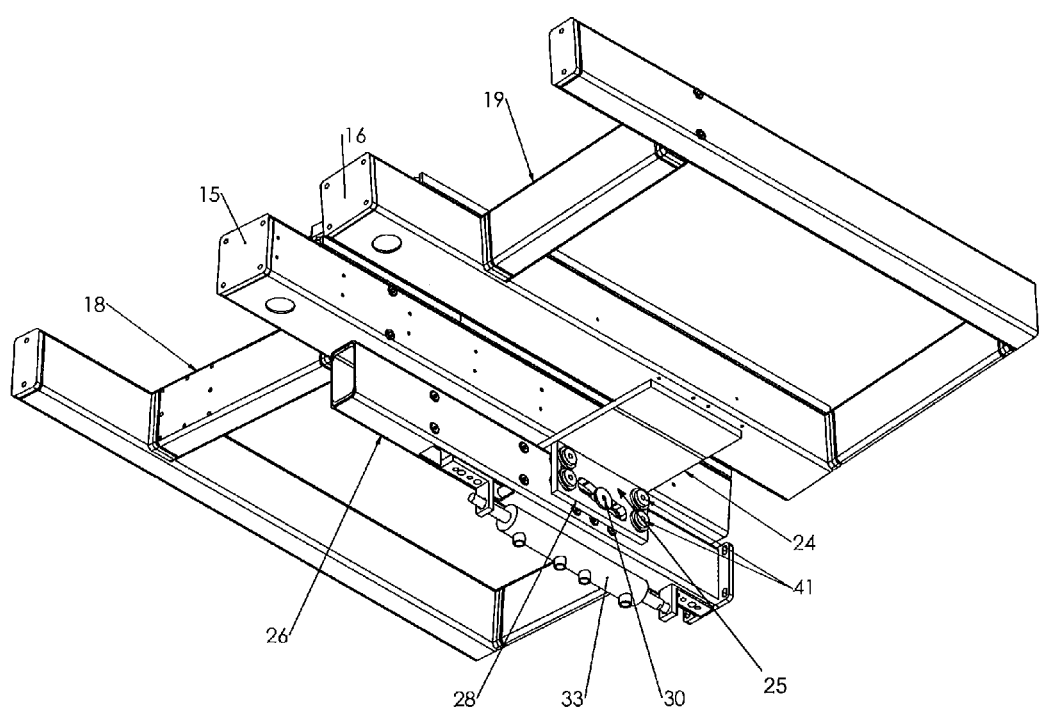
FIG. 11A is a bottom perspective view of the device shown in FIG. 11.

For the second tilting phase, which is schematised in FIGS. 7 and 8, the cylinder 33 moves the slider 31 so that the cylindrical body 30 moves in the two second slots 32 in the second and opposite direction. By means of this translational movement the upward movement of the U-shaped member 25 is obtained, since the cylindrical body 30 arranges itself in the second lateral region 29c, which with its lower edge forms a support for the cylindrical body 30 which is now at a height that is nearer to the lower edge of the plate 27 than is the lower edge of the central region 29a of the slot 29.

The lifting of the U-shaped member 25 produces the lifting of the bracket 24 and therefore of the bars 15 and 16 which rest upon it. In this way the symmetric and simultaneous upward tilting of the frames 18 and 19 and of the respective rows of suckers 11 and 12 is obtained.

The tilting sequence, first upward and then downward or vice versa, the tilting speed and the number of tilting manoeuvres are variable according to technical necessities in order to obtain the optimum cropping.

In practice it has been found that the invention fully achieves the intended aim and objects.

In particular, with the invention a tilting device has been provided which is capable of bending a sheet around the cut region, in a more effective manner than in known tilting devices.

Moreover, with the invention a tilting device has been provided that is cheaper to make than traction cropping devices yet no less effective, since there is only one actuator that performs all the movement.

Moreover, with the invention a tilting device for cropping a sheet of laminated glass has been provided that is structurally simple and easy to use, which can be made using known systems and technologies and at low cost.

The invention thus conceived is susceptible of numerous modifications and variations, all of which are within the scope of the appended claims. Moreover, all the details may be substituted by other, technically equivalent elements.

In practice the materials employed, as well as the dimensions and the contingent shapes, may be any according to requirements and to the state of the art.

The disclosures in Italian Patent Application No. PD2009A000313 from which this application claims priority are incorporated herein by reference.

Where technical features mentioned in any claim are followed by reference signs, such reference signs have been inserted for the sole purpose of increasing the intelligibility of the claims and accordingly such reference signs do not have any limiting effect on the interpretation of each element identified by way of example by such reference signs.

The invention claimed is:

1. A tilting device for cropping a sheet of laminated glass, comprising:
   a support frame;
   a first pivot frame having an upper side, a lower side opposite the upper side, a first frame end and a second frame end opposite the first frame end, wherein the first frame end is pivoted to the support frame;
   a second pivot frame having an upper side, a lower side opposite the upper side, a first frame end and a second frame end opposite the first frame end, wherein the first frame end is pivoted to the support frame;
   first and second glass engagement structures, wherein the first and second glass engagement structures each have an upper side and a lower side, wherein the upper side of each of the first and second glass engagement structures comprising one or more rows of suckers, the lower side of the first glass engagement structure is affixed to and supported by the upper side of the second end of the first pivot frame and the lower side of the second glass engagement structure is affixed to and supported by the upper side of the second end of the second pivot frame;
   a lift below the lower side of the second ends of the first and second pivot frames for simultaneously lifting and simultaneously lowering the second ends of the first and second pivot frames relative to a horizontal position for simultaneous tilting of the first and second pivot frames and the corresponding first and second glass engagement structures,
   wherein
   the first end of the first pivot frame and the first end of the second pivot frame are at horizontally spaced apart locations;
   the first and second pivot frames are arranged such that the second end of the first pivot frame is proximal to the second end of the second pivot frame and the second ends of the first and second pivot frames are between the first ends of the first and second pivot frames when the first and second pivot frames are pivoted to a horizontal position; and
   said lift comprises:
   at least one supporting bracket,
   a tubular member affixed to the at least one supporting bracket, and
   an upside-down U-shaped member having an upside-down U-shaped cross-section straddling the tubular member, wherein
   each of the supporting brackets has a width to receive the upside-down U-shaped member.

2. The device according to claim 1, wherein the upside-down U-shaped member comprises two opposite plates, each of said plates having a cam-shaped slot with steps, which is mirror symmetrical with respect to the slot of the opposite corresponding plate.

3. The device according to claim 2, wherein the device further comprises a slider located in the tubular beam and a cylindrical body affixed to the slider and positioned within the cam-shaped slots for slidably engaging the cam-shaped slots, whereby the cam-shaped slots act as guides for the cylindrical body, whereby the slider is capable of performing a translational motion within said tubular beam, and
   the tubular beam comprises a pair of tubular beam slots proximal to the cam-shaped slots having a first end, a second end, and a rectilinear extension in the direction of advancability of the slider in the tubular beam, wherein the first end and the second end of the tubular beam slot set two stroke limits for advanceability of the slider.

4. The device according to claim 3, wherein said device comprises an actuator having a first end engaged with the tubular beam and a second end engaged with the slider, whereby the actuator is capable of applying a translational motion within the tubular beam.

5. The device according to claim 4, wherein said actuator is a fluid-operated cylinder having a stem and a jacket, wherein the stem is affixed to the tubular beam and the jacket is affixed to the slider.

* * * * *